C. W. MILLS.
Grain Bin.
No. 90,116. Patented May 18, 1869.
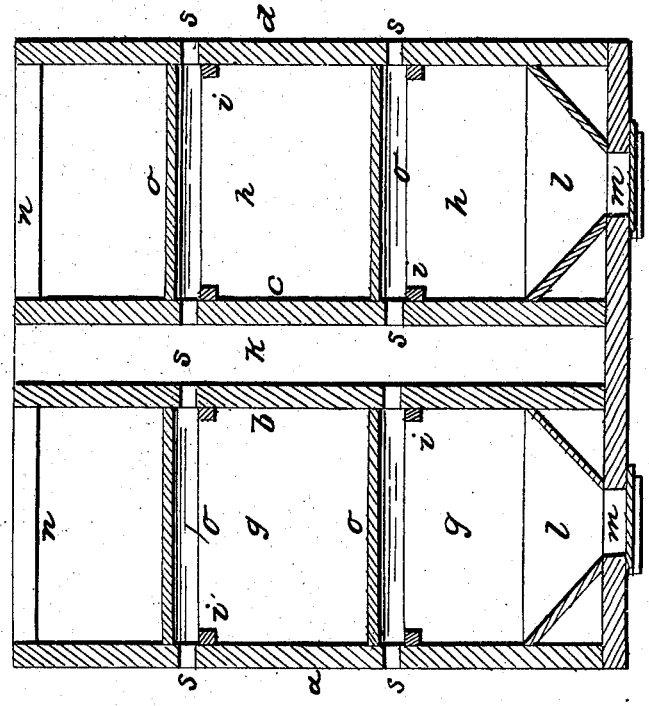
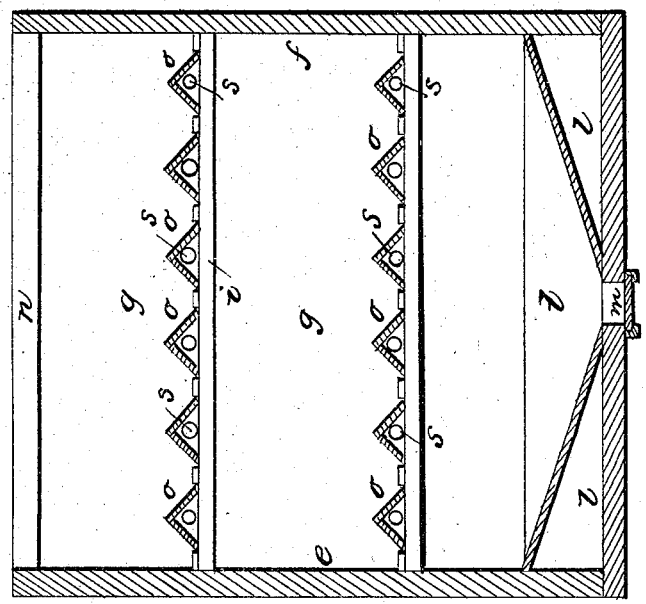
Witnesses
Inventor

United States Patent Office.

CLARK W. MILLS, OF BROOKLYN, NEW YORK.

Letters Patent No. 90,116, dated May 18, 1869.

IMPROVEMENT IN GRAIN-BINS.

The Schedule referred to in these Letters Patent and making part of the same.

*To all whom it may concern:*

Be it known that I, CLARK W. MILLS, of Brooklyn, in the county of Kings, and State of New York, have invented and made a new and useful Improvement in Bins for Grain, &c.; and I do hereby declare the following to be a full, clear, and exact description of the said invention, reference being had to the annexed drawing, making part of this specification, wherein—

Figure 1 is a vertical section of said bins through two ranges, and

Figure 2 is a section vertically and at right angles to fig. 1.

Similar marks of reference denote the same parts.

Heretofore it has been usual to store grain in large bins formed in warehouses, but, in consequence of the moisture of the grain, it frequently happens that the top will become mouldy, and the bottom portion caked and injured by the pressure, besides which it frequently happens that the grain in contact with the sides of the bin will be injured by the condensation of moisture from the heated interior portions.

To avoid these difficulties, smaller bins have been used in warehouses, placed upon the respective floors; but with these considerable room is lost, and there is more handling.

The nature of my said invention consists in a series of ventilating and supporting-troughs, applied transversely of the grain-bin, and in ranges, at suitable distances, one above another, so that the grain is even better ventilated than it would be in small bins, and there is no accumulation of pressure from any desired height of grain; hence all the difficulties heretofore experienced are entirely removed, and the bins can be made with economy in their construction, and a large quantity of grain be safely stored in as small a space as possible.

In the drawing—

*a b c d* represent vertical walls or partitions, forming the sides of the bin, and

*e* and *f* are other walls or partitions, forming the ends of the bins.

I have shown two bins, or grain-spaces, *g* and *h*, and an intermediate space, or ventilating-flue, *k*, but there may be any desired number of bins placed side by side.

The bottom, *l*, of the bin may be flat or hopper-shaped, to a slide, *m*, and any suitable roof, or top to the bin may be provided at *n*.

Along the sides of the bins, at suitable distances apart, vertically, I place cleats, or ledges *i i*, which, for convenience, should also have notches, for the reception of the ends of the troughs *o o*, that are formed of two boards, nailed together to form a ridge, and these troughs are of a length to reach from one side of the bin to the other.

These troughs *o* are placed at a small distance apart, so that the grain will pass from one portion of the bin to another, and these troughs, being placed in ranges, form floors or supports for the grain, and there is little or no pressure of the mass of grain in one compartment upon that below, because the grain below only prevents the grain above running through.

These troughs may be either movable or stationary, and, being of a ridge-form, there is a space left below each, into which the grain will not pass, and, at the ends of these spaces, openings *s s* are provided through the walls *a b* or *c d*, and the atmosphere circulating through these spaces conveys away, by the flue *k*, all the vapors from the grain, keeping the same thoroughly ventilated, and preventing injury.

I am aware, that in the patent of L. S. Chichester for grain-driers, dated February 25, 1868, a series of hopper-shaped inclines is made use of; I therefore do not claim the same.

I have arranged and applied the ventilating-troughs in ranges, so as to support the grain and adapt the device to a bin for storing grain, and at the same time ventilating the entire mass.

What I claim, and desire to secure by Letters Patent, is—

A grain-bin, formed with ranges of ventilating and supporting-troughs, introduced substantially as and for the purposes set forth.

In witness whereof, I have hereunto set my signature, this 25th day of February, A. D. 1869.

CLARK W. MILLS.

Witnesses:
GEO. D. WALKER,
GEO. T. PINCKNEY.